Dec. 28, 1937.  C. C. FARMER  2,103,353
LOAD BRAKE MECHANISM
Filed Sept. 3, 1936
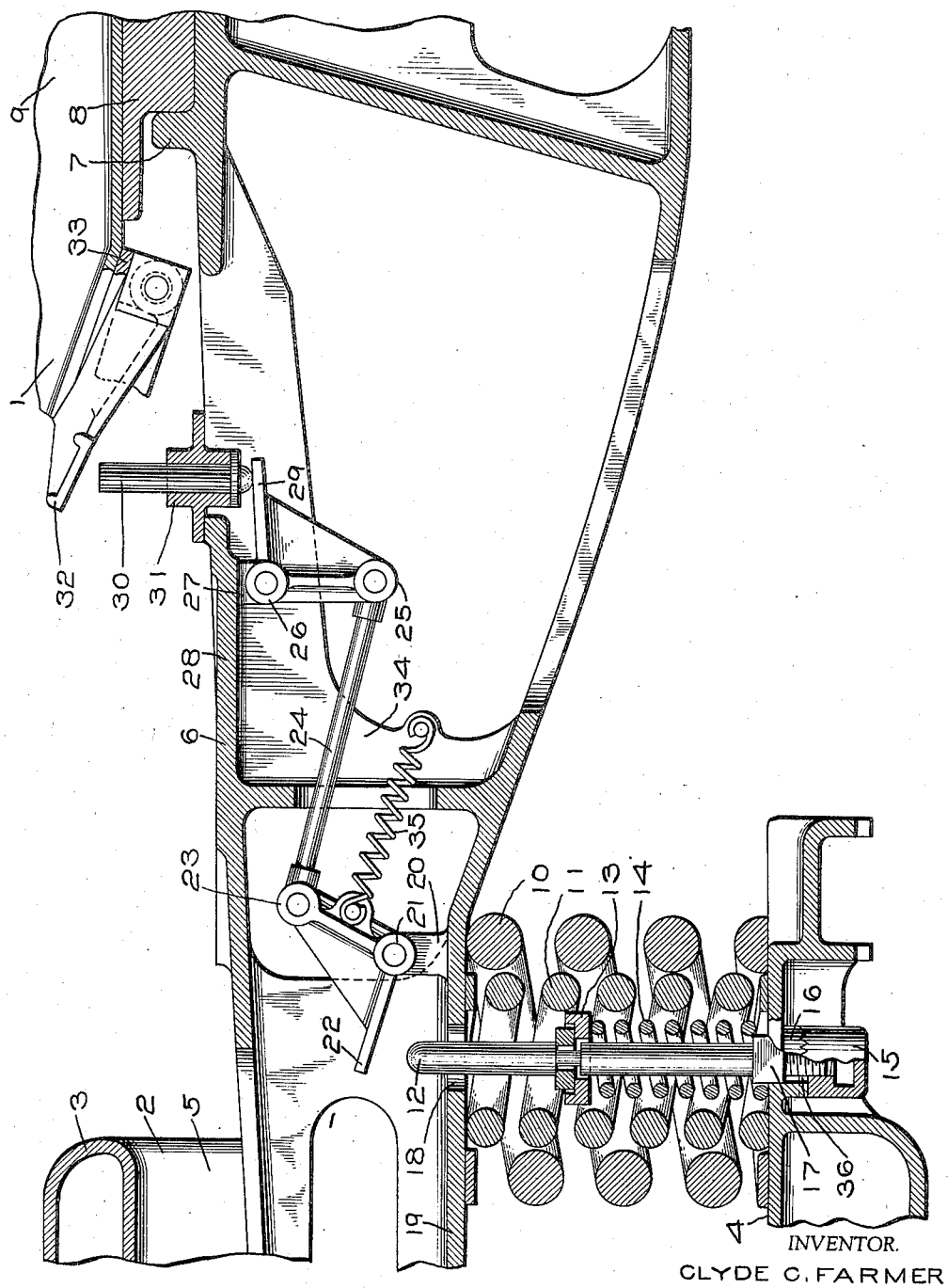
INVENTOR.
CLYDE C. FARMER
BY Wm. M. Cady
ATTORNEY.

Patented Dec. 28, 1937

2,103,353

UNITED STATES PATENT OFFICE 2,103,353

LOAD BRAKE MECHANISM

Clyde C. Farmer, Pittsburgh, Pa., assignor to The Westinghouse Air Brake Company, Wilmerding, Pa., a corporation of Pennsylvania Application September 3, 1936, Serial No. 99,211

4 Claims. (Cl. 188—195)

This invention relates to empty and load brake equipment adapted to be automatically set or conditioned for either light or heavy braking according to movement of the vehicle body relative to a fixed part of a truck of the vehicle under light and heavy loads and more particularly to the control strut mechanism of such equipments of the type adapted to be employed on railway vehicles and disclosed in my pending application, Serial No. 55,445, filed December 20, 1935, in which a portion of the mechanism is carried by the truck frame and a portion by the truck bolster.

The principal object of the present invention is to provide an improved control strut mechanism of the above mentioned type which is so arranged and constructed that it will not be set in operation in response to unavoidable vertical undulations of the truck frame and truck bolster relative to each other when in railway train service.

This object is obtained by normally maintaining the portion of the mechanism carried by the truck bolster out of operative engagement with that portion carried by the truck frame and against unwanted movement relative to the bolster.

Other objects and advantages will appear in the following more detailed description of the invention.

In the accompanying drawing, the single figure is a fragmentary cross-sectional view of a railway vehicle truck embodying the invention, a portion of the vehicle body being shown.

Referring now in detail to the drawing, the reference character 1 indicates the vehicle body and 2 the truck, each of which may be of any desired construction. It will here be understood that the control strut device is arranged at one side of truck as shown and in view of this only the left hand side of the truck has been shown and the following description will be more or less limited to that portion of the structure which is shown.

The truck side frame shown is of the cast metal type having upper and lower members 3 and 4 respectively and having a bolster opening 5 for the accommodation of one end of a cast metal truck bolster 6 which extends transversely of the truck. The truck bolster, intermediate its ends, is provided with the usual center plate 7 in which is rotatably mounted a body center plate 8 carried by the body bolster 9 of the vehicle body. The truck bolster is vertically movable relative to the side frame and at each end is yieldably supported by a plurality of nests of springs which are seated on the bottom member 4 of the truck frame, only one of such nests of springs being shown. Each nest of springs may comprise outer and inner coil springs 10 and 11, respectively.

Mounted on the bottom member 4 of the side frame and extending upwardly therefrom and through the center of one nest of bolster supporting springs is a strut 12 having secured thereto intermediate its ends a spring seat 13. Interposed between and engaging the spring seat and the bottom member 4 of the side frame is a coil spring 14 which is initially compressed to such an extent as to at all times exert an upwardly directed force on the strut.

The lower end of the strut extends through a square opening 36 in the side frame member 4 and is slidably guided thereby so as to permit vertical adjustment of the strut relative to the member 4, which adjustment may be effected by means of an adjusting nut 15 having screw-threaded connection with the lower end portion of the strut. The spring 14 acts through the medium of the spring seat 13 to hold the upper face of the adjusting nut in engagement with the end face of a boss 16 integral with and depending downwardly from the member 4. In the present embodiment of the invention, the said faces of the nuts and boss are provided with serrations which interengage to hold the adjusting nut against accidental rotation relative to the boss. The strut adjacent its threaded end is provided with a square portion 17 which is adapted to engage the member 4 within the square opening 36 in the member to prevent rotation of the strut.

The upper end of the strut extends into the interior of the truck bolster 6 through an opening 18 provided in the bottom wall 19 of the bolster.

Interiorly of the truck bolster, the wall 19 thereof is provided with an upwardly extending bracket 20 on which is rockably mounted a bell crank lever 21 having a horizontally disposed arm 22 which is normally spaced away from the upper end of the strut and which, as will hereinafter more fully appear, is adapted to be moved into and out of engagement with the strut. This lever also has an upwardly extending arm 23 which is operatively connected to one end of an operating rod 24 extending longitudinally of the bolster. The other end of the rod is operatively connected to the downwardly depending arm 25 of a bell crank lever 26 rockably mounted on a bracket 27 with which the upper wall 28 of the truck bolster is provided. The arm 29 of this lever is disposed at right angles to the arm 25 and operatively engages the lower end of a vertically disposed plunger 30 which is capable of vertical movement relative to the bolster and which is slidably guided in a guide 31 secured to the upper wall 28 of the bolster.

The upper end of the plunger is adapted to be engaged by a controlling arm 32 of the strut cylinder mechanism of the changeover portion of the empty and load brake equipment, said arm being pivotally mounted on a bracket 33 rigidly secured to the body bolster 9.

The portion of the empty and load brake equipment which is carried by the vehicle body may be identical with that fully disclosed in a joint application of Earl S. Cook and Ellis E. Hewitt, Serial No. 51,798, filed November 27, 1935, and since the present invention concerns the control means carried by the vehicle truck a detailed description of the brake equipment as a whole is deemed unnecessary.

Interposed between and attached to a vertically disposed rib 34 of the bolster and the arm 23 of the bell crank lever 21 is a spring 35 which acts to normally maintain the arm 22 out of contact with the upper end of the strut and which acts through the medium of the arm 23, operating rod 24 and bell crank arms 25 and 29 to maintain the plunger 30 in its uppermost position against accidental vertical movement. It will here be noted that since the arm 22 is out of engagement with the strut 12 and the plunger 30 is held against accidental vertical movement relative to the bolster and to the bell crank arm 29 undesirable chatter of the several parts of the mechanism is prevented.

When the vehicle is being loaded, the body 1, arm 32 carried thereby, truck bolster 6, bell crank levers, connecting rod 24 and plunger 30 move downwardly as a unit relative to the side frame and strut 12 of the truck 2, the bolster compressing the supporting springs 10 and 11. As the bolster is thus being moved, the space between the upper end of the strut 12 and the arm 22 of the bell crank lever 21 is shortened.

When the vehicle is empty or loaded up to one-half of its capacity, the distance between the arm 22 and the upper end of the strut 12 will be sufficient to permit the arm 32 carried by the car body to make its full traverse to empty position, however, when the vehicle is loaded to slightly more than one-half of its capacity the space between the arm 22 and the strut 12 will have been so reduced that when the control member moves downwardly the arm 22 of the bell crank will engage the upper end of the strut 12 before the member 32 has moved to empty position and when this occurs the plunger 30 will bring the member 32 to a stop and the brake equipment will be adjusted for load service. It will here be noted that the spring 14 is of such value that the force of the member 32 transmitted to the strut 12, by way of the plunger 30 and operatively connected bell crank levers 21 and 26 will not be great enough to force the strut downwardly against the opposing action of this spring.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle, in combination, a vehicle body, a supporting truck for said body comprising a side frame and a member associated with said side frame and movable vertically relative thereto according to the load carried by said body, an empty and load brake control element having an empty position and a load position and operatively carried by said vehicle body, a strut carried by said side frame, and a control mechanism carried by said member and movable vertically therewith and adapted to cooperate with said strut and element to control the positioning of said element according to the load carried by said body, said control mechanism being normally out of operative engagement with said strut and being movable into operative engagement therewith by said element.

2. In a vehicle, in combination, a vehicle body, a supporting truck for said body comprising a side frame and a truck bolster associated with said side frame and movable vertically relative thereto according to the load carried by said body, an empty and load brake control element having an empty and a load position and operatively carried by said body, a control mechanism carried by said bolster and movable vertically therewith adapted to be operated by said element, and a strut carried by said side frame for controlling the operation of said control mechanism and thereby said element to one or the other of said positions according to the load on said body, said mechanism being normally maintained out of operative engagement with said strut.

3. In a vehicle, in combination, a vehicle body, a supporting truck for said body comprising a side frame and a truck bolster associated with said side frame and movable vertically relative thereto according to the load carried by said body, an empty and load brake control element having an empty position and a load position and operatively carried by said body, a control mechanism carried by said bolster and movable vertically therewith adapted to be operated by said element, and a strut carried by said side frame for controlling the operation of said control mechanism and thereby said element to one or the other of said positions according to the load on said body, said mechanism being normally maintained out of operative engagement with said strut, and said element being normally maintained out of operative engagement with said control mechanism.

4. In a vehicle, in combination, a vehicle body, a supporting truck for said body comprising a side frame and a truck bolster associated with said side frame and movable vertically relative thereto according to the load carried by said body, an empty and load brake control element having an empty position and a load position and operatively carried by said body, a control mechanism carried by said bolster and movable vertically therewith adapted to be operated by said element, and a strut carried by said side frame for controlling the operation of said control mechanism and thereby said element according to the load on the body, said control mechanism being normally out of operative engagement with said element and said strut and extending longitudinally of the bolster into the vertical planes of both the element and the strut.

CLYDE C. FARMER.